Oct. 1, 1940.  W. T. CALDWELL  2,216,291
PISTON
Filed Nov. 29, 1937
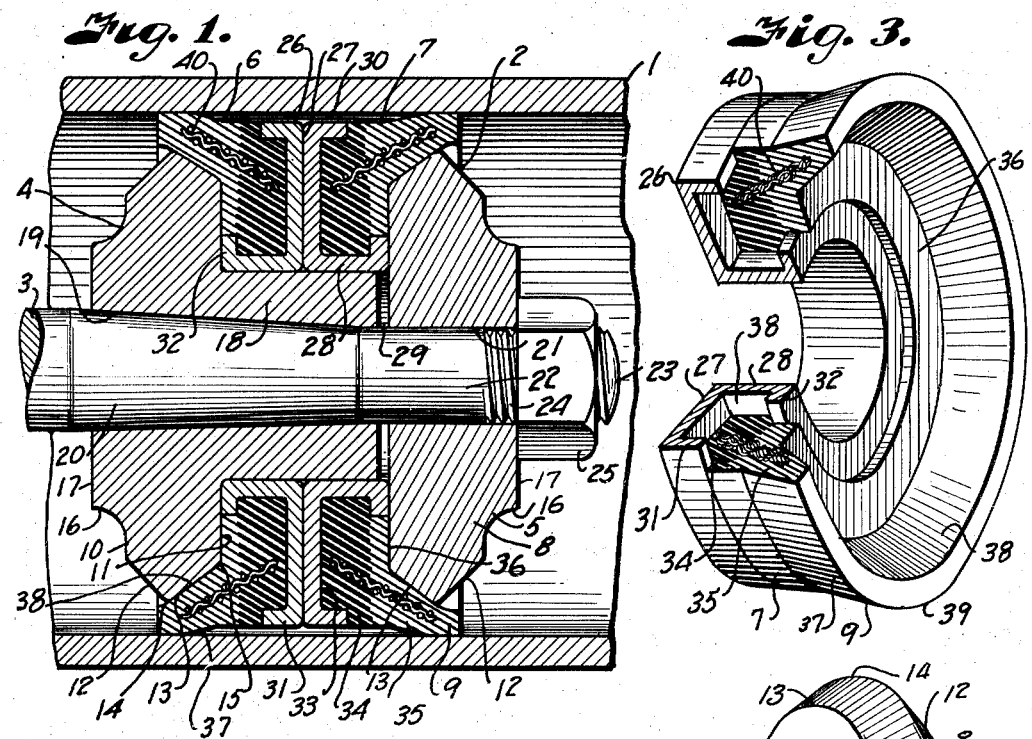
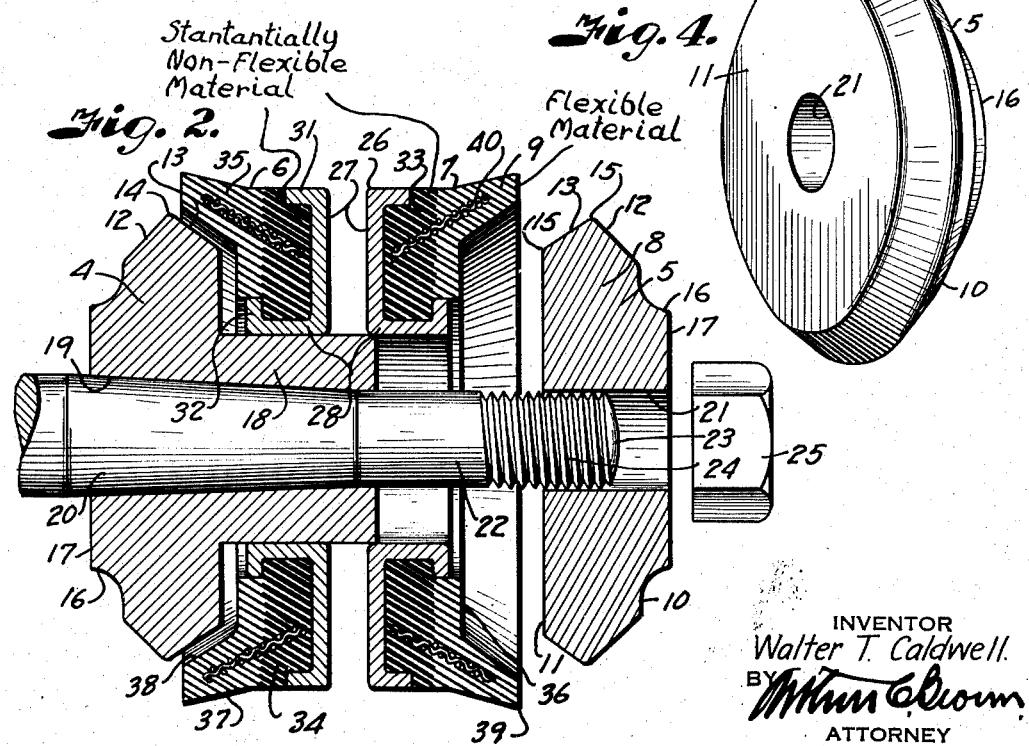
INVENTOR
Walter T. Caldwell.
BY
ATTORNEY icted Oct. 1, 1940

2,216,291

UNITED STATES PATENT OFFICE 2,216,291

PISTON

Walter T. Caldwell, Enid, Okla., assignor to The George E. Failing Supply Company, Enid, Okla., a corporation of Oklahoma Application November 29, 1937, Serial No. 176,966

4 Claims. (Cl. 309—23)

This invention relates to pistons and particularly those for use in pumps, hydraulic jacks and like devices having pistons equipped with ring-like packing cups formed of soft, resilient materials so that they are sufficiently flexible to be urged into sealing contact with a cylinder wall responsive to fluid pressure acting upon the cups.

Packings of this character are difficult to anchor in the piston structure because of their soft, resilient character. They also do not have sufficient body to adequately support the sealing lips thereof in contact with the cylinder wall, consequently the lips become distorted and leakage results particularly when the pistons are operating under high working pressures. This difficulty is overcome in part by the provision of composite packing rings having lip portions of resilient material supported by body portions formed of more rigid material. This construction effectively seals the piston but the resilient material tends to separate from the more rigid material after the piston has been in service. The more resistant material also tends to disintegrate in service because of the clamping pressure necessary to securely anchor the packing rings. This clamping pressure effects compression of the clamped parts of the ring and causes distortion of the unsupported portions with the result that the forces are unevenly distributed and the rings have internal stresses which cause the rings to split. These internal stresses are also contributing factors causing the resilient portions of the rings to separate from the body portions thereof.

It is, therefore, a principal object of the present invention to provide a piston with composite packing rings having sealing portions sufficiently resilient to effect an adequate seal with the cylinder wall and which are carried by firmer material of substantially less flexibility and which is firmly carried within metal rings so as to limit the distortion thereof. The metal ring portions also provide more effective means for anchoring the yieldable elements of the packing rings between the clamping heads of the piston, thereby assuring a solid piston structure.

It is a further object of the invention to effect seal through the interior of the piston by means of the flexible portions of the packing elements so that it is not necessary to distort the more rigid material thereby reducing internal stresses within the packing ring structure.

Another important object of the invention is to provide a secure method of attaching the flexible parts of the packing rings to the more rigid base material.

In accomplishing these and other objects of the invention, as hereinafter pointed out, I have provided improved details of structure, the preferred form of which is illustrated in the accompanying drawing, wherein:

Fig. 1 is a longitudinal sectional view through a piston constructed and equipped with packing rings in accordance with the present invention and showing the flexible portions of the packings urged in sealing contact with the working surface of a cylinder wall.

Fig. 2 is a similar section through the parts of the piston which are shown in slightly spaced relation to better illustrate their construction and the normal shape of the resilient portions of the packing rings before they are clamped in the piston assembly and placed within the cylinder.

Fig. 3 is a perspective view of one of the packing rings, a part of which is broken away to better illustrate the construction thereof.

Fig. 4 is a perspective view of one of the piston heads or packing ring clamping members, particularly illustrating the clamping face thereon.

Referring more in detail to the drawing:

1 designates a portion of the cylinder of a pump, hydraulic jack or similar apparatus wherein a fluid is acted upon by a piston 2 under high working pressures as in the case of a pump, or wherein a high pressure fluid operates the piston as in the instance of a hydraulic jack. In either instance, the piston is slidable relative to the cylinder under control of a piston rod 3, and it is necessary to maintain a tight seal about the periphery of the piston to prevent leakage of fluid around and through the piston.

The piston 2 is designed to maintain a seal between high pressure fluids in the respective ends of the cylinder as in the case of a double acting pump or a hydraulic jack where the pressure fluid acts on both ends of the piston. The piston is of composite construction and includes a pair of clamping members or heads 4 and 5 for retaining oppositely facing packing rings 6 and 7. The clamping members 4 and 5 each include a substantially disc-like body 8 of thickness to withstand the necessary working pressures and of small diameter than the inner diameter of the cylinder to accommodate flexible lips or flanges 9 on the packing rings, as later described.

The peripheral corners of the discs are beveled from the end faces 10 and 11 toward the center thereof, as shown at 12 and 13, to terminate in a slightly rounded periphery 14. The beveled faces 13 of the respective discs constitute annular seating faces for the lip portions 9 of the packing rings and the junctures thereof with the end faces 11 are slightly rounded, as at 15. The opposite end faces 10 of the discs carry outwardly projecting cylindrical bosses 16 having flat ends 17.

The disc-like body of the clamping member 4 has a packing centering collar 18 projecting from the end face 11 thereof and of sufficient length to mount the packing rings 6 and 7 thereon so that the packing elements are concentric with the axis of the piston and are clamped between the end or clamping faces 13 of the respective members 4 and 5. The member 4 is further provided with a tapered, axial bore 19, with its larger end opening through the boss 16 thereof to accommodate a correspondingly tapered portion 20 of the piston rod 3. The clamping member 5, however, has a central, cylindrical bore 21 registering with the smaller end of the tapered bore of the other member to accommodate a cylindrical extension 22 of the piston rod. The terminal end 23 of the rod projects from the boss 16 of the clamping member 5, and is provided with threads 24 for mounting a jam-nut 25. The clamping member 4, when mounted on the tapered portion of the piston rod, is securely wedged from longitudinal movement and forms an abutment against which the packing elements are clamped by the other clamping member 5, the member 5 being slidably movable on the extension 22 responsive to tightening of the nut 25.

The packing elements 6 and 7 are of composite construction and each includes a rigid metal backing or packing retaining member 26 of substantially C shaped cross-section to provide an annular disc-like wall 27 extending radially from a collar portion 28, of suitable diameter to be snugly slidable on the centering collar 18 of the clamping member 4. The combined width of the backing members of both packing rings is slightly greater than the length of the centering collar 18 to provide a space 29 between the end of the centering collar and the clamping face 11 of the member 5 when the parts of the piston are drawn into clamping relation, as later described. The outer diameter of the disc-like wall 27 is slightly less than the inner diameter of the cylinder so as to leave a working space 30 therebetween. Extending from the terminal ends of the wall 27 and collar 28 are lateral flanges 31 and 32 respectively to cooperate in forming an annular pocket 33.

Enclosed within the pocket of each backing member is a packing base of substantially non-flexible material, such as hard rubber 34, to which is autogenously connected a more resilient and flexible material, such as soft rubber 35. The soft rubber 35 is shaped to project over the flange 32 to form a flat clamp engaging face 36 and extending from the periphery thereof in overlying relation with a respective seating bevel 13, is the annular lip or flange portion 9, above mentioned. The annular lip portions 9 have outwardly flaring annular faces 37 that sealingly contact with the working surface of the cylinder and inner tapering faces 38 which correspond to the bevels 13 of the clamping member so that the lips are supported thereby from excessive distortion when the piston is in service. The terminal portions 39 of the lips, when in relaxed condition, as shown in Fig. 2, are of normally larger circumference than the inner circumference of the cylinder so that when the packing rings are secured in the piston assembly and the piston assembly is inserted in the cylinder, the lips are pressed over the rounded peripheries 14 of the disc portions of the clamping members, as shown in Fig. 1.

In order to more securely anchor the soft resilient rubber to the harder and firmer rubber, a reinforcing or tie member 40, here shown as comprising an annular section of woven material such as wire cloth, is imbedded within the ring, with a part thereof extending into the body of the flexible lip 9 and a part into the base material 34. For certain types of packing rings a number of ties may be necessary but for ordinary purposes one tie will suffice.

In assembling the piston parts constructed as described, the clamping member 4 is pressed upon the tapered portion 20 of the piston rod so that it is rigidly retained from longitudinal movement thereof. The packing rings 6 and 7 are then sleeved over the centering collar 18 with the walls 26 in back to back relation after which the clamping member 5 is sleeved over the extension 22 and the jam-nut 25 is applied on the threaded terminal of the piston rod. The jam-nut 25 is then tightened to draw the end flanges 32 of the members 26 into abutment with the clamping members, as shown in Fig. 1. When thus tightened, the flat faces 36 of the soft rubber are pressed against the clamping face 11 of the clamping members to prevent leakage through the body of the piston.

The flaring faces 37 of the flexible lip portions 9 of the packing rings are firmly seated on the beveled faces 13 to support the terminal of the lips or flange 9 in cylinder sealing position. The piston assembly is then inserted in the cylinder so that the flexible lips thereof are pressed over the rounded peripheries 14 of the clamping members, as shown in Fig. 1.

A piston constructed and equipped with packing rings as described is serviceable for long periods under high working pressures without leakage and since the base material of low flexibility is contained within the C shaped pockets of the backing rings, it is rigidly retained and protected from distorting pressures when the clamping heads of the piston are urged into rigid engagement with the collar portion of the rings. Drawing up of the clamping members presses the parts of the resilient portions that normally project beyond the flanges 32 to maintain a seal with the clamping surfaces of the piston heads and thereby prevent leakage through the interior of the piston.

The packing rings formed as units may be conveniently removed from the piston and new units applied as occasion demands. It is further apparent that repairs to the piston and replacement of parts may be carried out with ordinary tools that are readily available.

What I claim and desire to secure by Letters Patent is:

1. In a piston, a pair of clamping members, one of said members having a collar, a pair of packing rings mounted on said collar, each including a backing member having an annular disk-like wall, an inner collar portion terminating in a radial stop flange and an outer laterally extending perimetric flange all cooperating to form an annular pocket of substantially C-shaped cross-section, a substantially non-flexible material contained in said pockets of the backing members, flexible resilient face portions autogenously connected with said non-flexible material and having lip portions for sealingly engaging the wall of a cylinder, said packing rings being arranged on said collar with the annular disk-like walls in abutting contact and with said radial stop flanges abutting against the clamping members to limit extent of distortion of said flexible facings, and means extending through the clamping members to draw said clamping members into sealing contact with said packing rings and to support said packing rings in fixed position on said collar.

2. In a piston, a pair of clamping members, one of said members having a collar, a pair of packing rings mounted on said collar, each including a backing member having an annular disk-like wall, an inner collar portion and an outer laterally extending perimetric flange all cooperating to form an annular pocket of substantially C-shaped cross-section, a substantially non-flexible packing material contained in said pockets of the backing members, flexible resilient facings having autogenous connection with said non-flexible material and having a lip portion for sealingly engaging the wall of a cylinder, said packing rings being arranged on said collar with the annular disk-like walls in abutting contact and with said inner collar portions forming stops abutting against the clamping members to limit extent of distortion of said flexible facings, means extending through the clamping members to draw said clamping members into sealing contact with said packing rings and to support said packing rings in fixed position on said collar, the peripheries of said clamping members being shaped to form backing supports for said lip portions, and reinforcement members imbedded in the lip portions of the packing rings and extending into the portions of the non-flexible material contained in said pockets to cooperate with the clamping members in supporting said lip portions.

3. A packing ring including a backing member having an annular disk-like wall, an inner collar portion terminating in a radial flange portion and having an outer lateral perimetric flange portion, said portions cooperating to form an annular pocket of substantially C-shaped cross-section, a substantially non-flexible material contained in said pocket, a flexible resilient face portion autogenously connected with said non-flexible material and having a lip portion for sealingly engaging the wall of a cylinder, and a reinforcement imbedded in the lip portion and projecting into the portion of the non-flexible material contained in said C-shaped pocket to support said lip portion.

4. A packing ring including a backing member having an annular disk-like wall, an inner collar portion projecting from one side of the wall and an outer annular flange projecting from the wall in the same direction as the collar portion and of shorter length to form an annular pocket of substantially C-shaped cross-section, a substantially non-flexible material contained in said pocket, and a flexible resilient face portion connected with said non-flexible material and having a clamping face substantially registering with the end of the collar portion and provided with a lip portion for sealingly engaging the wall of a cylinder.

WALTER T. CALDWELL.